United States Patent
Tanke, II et al.

(10) Patent No.: US 6,435,050 B1
(45) Date of Patent: Aug. 20, 2002

(54) STEERING GEAR FOR MOTOR VEHICLE

(75) Inventors: Eugene Thomas Tanke, II, Vassar, MI (US); Carlos F. Garza, Chih (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/819,501

(22) Filed: Mar. 28, 2001

(51) Int. Cl.⁷ .................................................. F16H 1/04
(52) U.S. Cl. .................................... 74/422; 280/93.514
(58) Field of Search ............................. 74/390, 388 R, 74/422, 458; 180/400; 280/93.514, 93.515

(56) References Cited

U.S. PATENT DOCUMENTS

| | | | |
|---|---|---|---|
| 4,454,801 A | | 6/1984 | Spann |
| 4,828,068 A | * | 5/1989 | Wendler ...................... 180/148 |
| 4,853,672 A | * | 8/1989 | Yasuda ........................ 340/465 |

\* cited by examiner

Primary Examiner—Christopher P. Schwartz
Assistant Examiner—C. T. Bartz
(74) Attorney, Agent, or Firm—Edmund P. Anderson

(57) ABSTRACT

A rack and pinion steering gear including a housing, a rack bar having a rack gear thereon, a pinion gear rotatably supported on the housing, and a rack bearing which slidably engages the rack bar and resiliently thrusts the rack gear against the pinion gear. The pinion gear and the rack bearing constitute a first bearing supporting the rack bar on the steering gear housing for back and forth linear translation. A bushing on the steering gear housing remote from the pinion gear and the rack bearing constitutes a second bearing supporting the rack bar on the steering gear housing for back and forth linear translation. An outboard bearing on the steering gear housing on the opposite side of the pinion gear from the bushing thrusts the rack bar parallel to the direction of the rack bearing and includes an asymmetrically resiliently compressed elastomeric ring on a seat on the steering gear housing and a sleeve mounted eccentrically on the elastomeric ring and slidably engaging the rack bar. The outboard bearing suppresses separation between the pinion gear and the rack gear by supplementing the thrust of the rack bearing and by reducing the overhang distance of the rack bar.

3 Claims, 2 Drawing Sheets

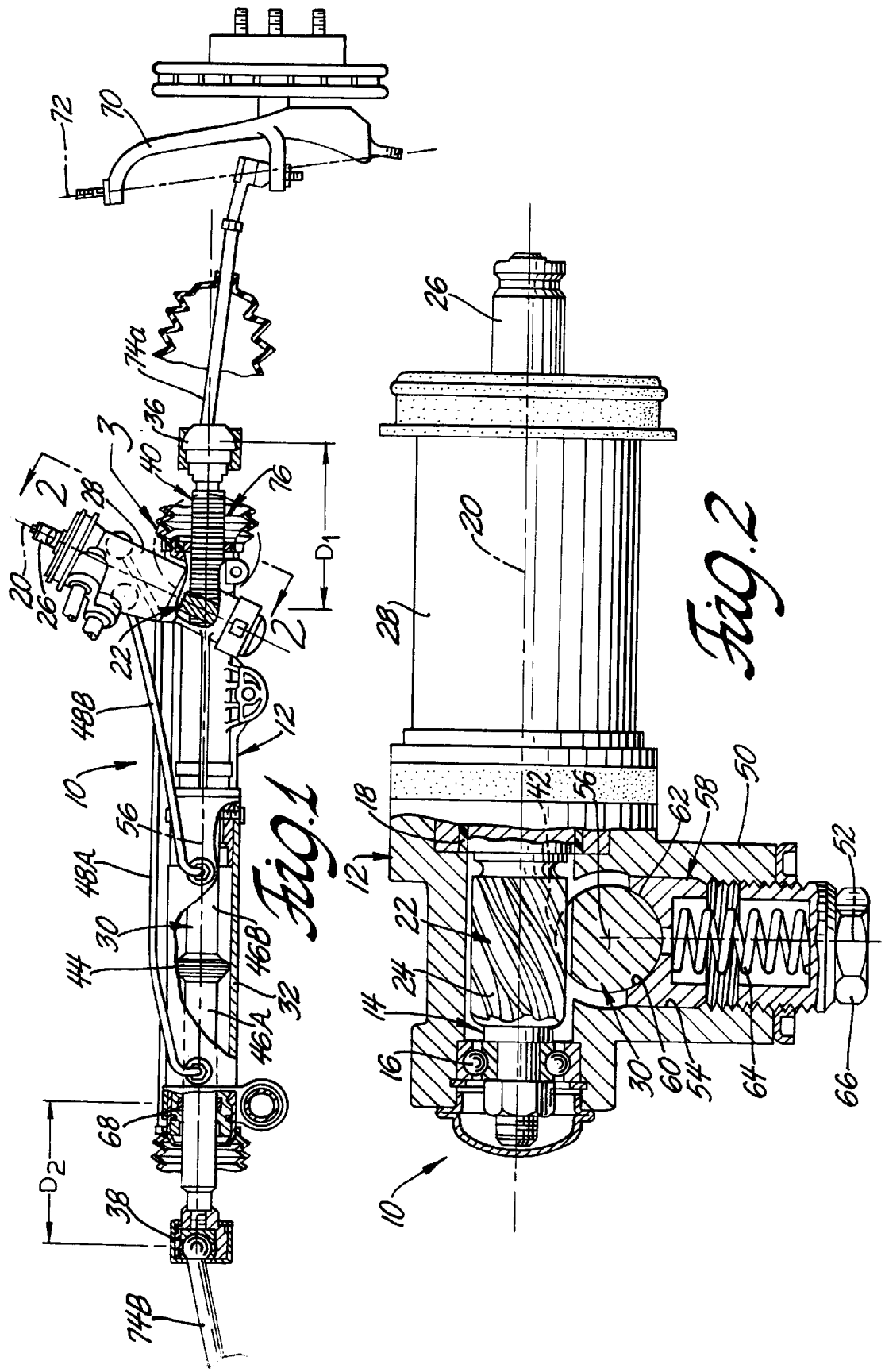

STEERING GEAR FOR MOTOR VEHICLE

TECHNICAL FIELD

This invention relates to a rack and pinion steering gear for a motor vehicle.

BACKGROUND OF THE INVENTION

A typical rack and pinion steering gear for a motor vehicle includes a housing, a rack bar having a rack gear thereon, a pinion gear rotatably supported on the housing, and a rack bearing which slidably engages the rack bar and resiliently thrusts the rack gear against the pinion gear. The pinion gear and the rack bearing constitute a first bearing supporting the rack bar on the steering gear housing for back and forth linear translation in the direction of a longitudinal centerline of the rack bar concurrent with rotation of the pinion shaft. A bushing on the steering gear housing remote from the pinion gear and the rack bearing constitutes a second bearing supporting the rack bar on the steering gear housing for back and forth linear translation in the direction of the longitudinal centerline of the rack bar. Opposite ends of the rack bar are linked by tie rods to respective ones of a pair of steering knuckles supported on a body of the motor vehicle for vertical suspension excursions and for rotation about vertical steering axes of the motor vehicle. Each steering knuckle has a dirigible road wheel rotatably supported thereon. Back and forth linear translation of the rack bar in the direction of its longitudinal centerline pivots the steering knuckles about the steering axes to steer the motor vehicle.

When the motor vehicle is in motion, the tie rods transfer forces from the steering knuckles to the ends of the rack bar which can cause the rack bar to vibrate. A variable which affects the frequency and amplitude of such vibrations and which is usually beyond the control of the manufacturer of the steering gear is the "overhang distance" of the rack bar, i.e. the distance by which one end of the rack bar overhangs the bushing and other end of the rack bar overhangs the pinion gear and rack bearing. Typically, as the overhang distance increases, the intensity of the vibrations of the rack bar increases and the vibrations are more likely to induce momentary separation between the pinion gear and the rack gear which manifests itself as audible "rack bar rattle". A rack and pinion steering gear according to this invention includes structural elements for suppressing such rack bar rattle.

SUMMARY OF THE INVENTION

This invention is a new and improved rack and pinion steering gear including a housing, a rack bar having a rack gear thereon, a pinion gear rotatably supported on the housing, and a rack bearing which slidably engages the rack bar and resiliently thrusts the rack gear against the pinion gear. The pinion gear and the rack bearing constitute a first bearing supporting the rack bar on the steering gear housing for back and forth linear translation in the direction of a longitudinal centerline of the rack bar concurrent with rotation of the pinion shaft. A bushing on the steering gear housing remote from the pinion gear and the rack bearing constitutes a second bearing supporting the rack bar on the steering gear housing for back and forth linear translation in the direction of the longitudinal centerline of the rack bar. An outboard bearing on the steering gear housing on the opposite side of the pinion gear from the bushing thrusts the rack bar parallel to the direction of the rack bearing and includes an elastomeric ring seated in a seat on the steering gear housing symmetric with respect to the longitudinal centerline of the rack bar and a sleeve mounted eccentrically on the elastomeric ring and slidably engaging the rack bar. The outboard bearing suppresses separation between the pinion gear and the rack gear by supplementing the thrust of the rack bearing and by reducing the overhang distance of the rack bar.

BRIEF DESCRIPTION OF THE DRAWINGS

FIG. 1 is a partially broken-away plan view of a rack and pinion steering gear according to this invention;

FIG. 2 is a partially broken-away sectional view taken generally along the plane indicated by lines 2—2 in FIG. 1;

DESCRIPTION OF THE PREFERRED EMBODIMENT

Figure 3:
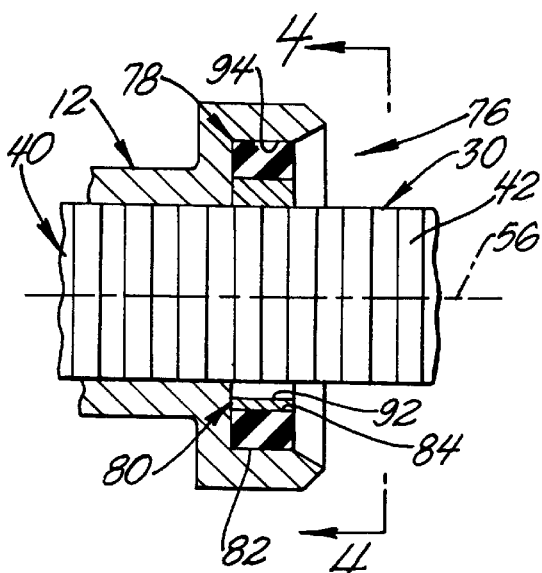
FIG. 3 is an enlarged view of the portion of FIG. 1 identified by reference circle "3" in FIG. 1.

Referring to FIGS. 1–2, a rack and pinion steering gear 10 according to this invention includes a steering gear housing 12 rigidly attached to a body, not shown, of a motor vehicle. A pinion shaft 14 is supported on the steering gear housing 12 by a roller bearing 16 and by a sleeve bearing 18 for rotation about a pinion shaft axis 20 of the steering gear housing. An integral pinion gear 22 on the pinion shaft 14 between the bearings 16,18 includes a plurality of helical gear teeth 24. The pinion shaft 14 is coupled to an input shaft 26 by a rotary control valve, not shown, inside of a valve housing portion 28 of the steering gear housing. A suitable rotary control valve is described in U.S. Pat. No. 4,454,801, issued Jun. 19, 1984 and assigned to the assignee of the this invention. The input shaft 26 is connected to a manual steering hand wheel, not shown, on a steering column on the motor vehicle body.

A rack bar 30 traverses the steering gear housing 12 and a cylinder tube 32 of a steering assist fluid motor rigidly attached to the steering gear housing. The rack bar has a first end 36, a second end 38, and a rack gear 40 consisting of a plurality of flat rack gear teeth 42 on the rack bar facing the helical pinion gear teeth 24. A piston 44 on the rack bar cooperates with a pair of seals at opposite ends of the cylinder tube 32 in dividing the cylinder tube into a pair of working chambers 46A,46B. The aforesaid rotary control valve selectively and alternately connects the working chambers 46A,46B to an inlet port and a discharge port on the valve housing portion 28 through respective ones of a pair of external fluid conduits 48A,48B.

Figure 4:
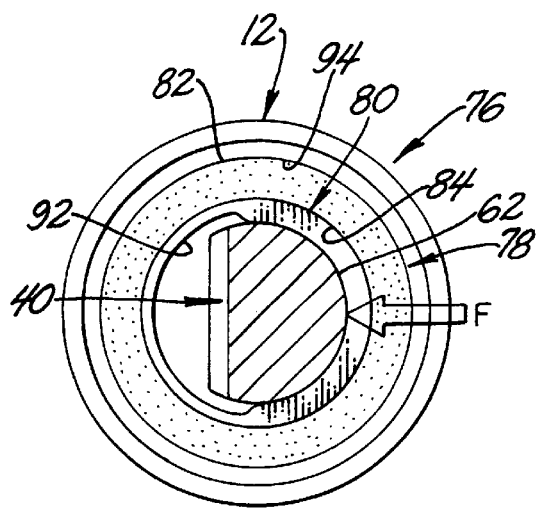
FIG. 4 is a sectional view taken generally along the plane indicated by lines 4—4 in FIG. 3.

As seen best in FIGS. 1–4, the steering gear housing 12 has an integral tubular boss 50 on the opposite side of the rack bar from the pinion gear 22. A longitudinal centerline 52 of a cylindrical inner wall 54 of the tubular boss 50 is perpendicular to the pinion shaft axis 20 and to a longitudinal centerline 56 of the rack bar. A rack bearing 58 is supported in the cylindrical inner wall 54 for linear translation in the direction of the longitudinal centerline 52 of the cylindrical inner wall. A concave seat 60 on the rack bearing faces an elongated convex seat 62 on the rack bar behind the rack gear 40 and opposite the pinion gear 22. A rack bearing spring 64 is disposed between the rack bearing 58 and a screw-threaded adjuster plug 66 on the steering gear housing in a screw-threaded portion of the cylindrical inner wall 54 of the tubular boss 50.

The rack bearing spring 64 is flexed in compression between the adjuster plug 66 and the rack bearing 58 to thrust the rack bearing against the convex seat 62 on the rack bar in the direction of the longitudinal centerline 52 of the cylindrical inner wall 54. The rack bearing, therefore, thrusts together the rack gear teeth 42 and the helical pinion gear teeth 24 in the direction of the longitudinal centerline 52 to eliminate lash, i.e. dimensional clearance, therebetween. Rotation of the adjuster plug in the tubular boss varies the span between the rack bearing and the adjuster plug to vary the compression flexure of the rack bearing spring 64.

With the rack bar thus captured between the pinion gear 22 and the rack bearing 58, the pinion gear and the rack bearing constitute a first omnidirectional, i.e. substantially 360° around the longitudinal centerline 56 of the rack bar, slide bearing supporting the rack bar on the steering gear housing for back and forth linear translation in the direction of its longitudinal centerline concurrent with rotation of the pinion gear. A bushing 68, FIG. 1, on the cylinder tube 32 remote from the rack bearing 58 constitutes a second omnidirectional slide bearing supporting the rack bar on the steering gear housing for back and forth linear translation in the direction of its longitudinal centerline.

A pair of steering knuckles are supported on the body of the motor vehicle for vertical suspension excursions and for pivotal movement about respective ones of a pair of generally vertical steering axes, only a representative steering knuckle 70 pivotable about a steering axis 72 being illustrated in FIG. 1. Each steering knuckle has a dirigible road wheel, not shown, rotatably supported thereon. A pair of tie rods 74A, 74B are coupled to the rack bar at the first end 36 and the second end 38 thereof for linear translation as a unit with the rack bar and for universal articulation. The tie rods 74A, 74B are also connected to corresponding ones of the steering knuckles for universal articulation. Back and forth linear translation of the rack bar 30 in the direction of its longitudinal centerline 56 pivots the steering knuckles about the steering axes. The tie rods 74A, 74B pivot up and down relative to the rack bar concurrent with vertical suspension excursions of the steering knuckles.

When the motor vehicle is in motion, the tie rods 74A, 74B transfer forces from the steering knuckles to the ends 36, 38 of the rack bar which can cause the rack bar to vibrate. An overhang distance "$D_1$" between the first end 36 of the rack bar and the first omnidirectional slide bearing constituted by the rack bearing 58 and the pinion gear 22 is a variable which affects the frequency and amplitude of such vibrations. A corresponding overhang distance "$D_2$" between the second end 38 of the rack bar and the second omnidirectional slide bearing constituted by the bushing 68 likewise affects the frequency and amplitude of such vibrations. The overhang distances $D, D_2$ are often beyond the control of the manufacturer of the steering gear 10 and, as their magnitudes increase, the intensity of the rack bar vibrations also increase and are more likely to induce momentary separation between the pinion gear teeth 24 and the rack gear teeth 42 which separation manifests itself as audible "rack bar rattle".

Figure 5:
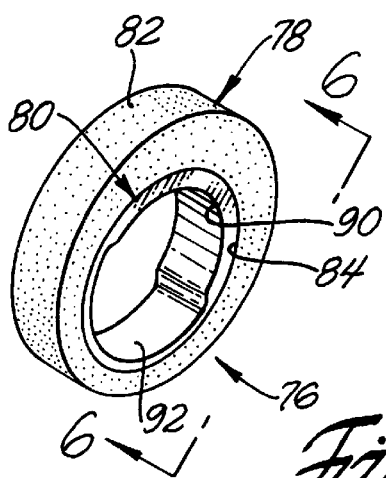
FIG. 5 is a perspective view of an outboard bearing of the rack and pinion steering gear according to this invention.
Figure 6:
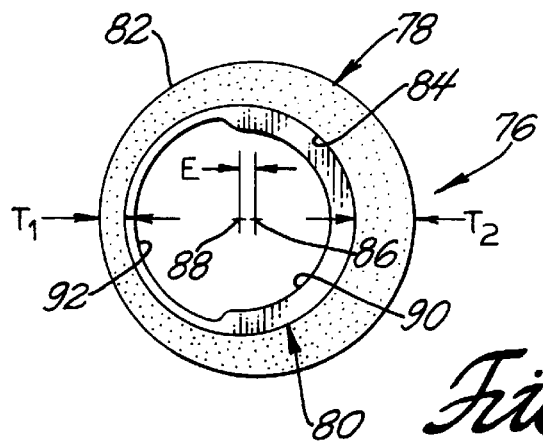
FIG. 6 is a view taken generally along the plane indicated by lines 6—6 in FIG. 5.

As seen best in FIGS. 1 and 3–6, a third or outboard bearing 76 on the steering gear housing 12 on the opposite side of the pinion gear 22 from the bushing 68 includes an elastomeric ring 78 and a bearing element in the form of a sleeve 80. The elastomeric ring has a cylindrical outside surface 82 and a cylindrical inside surface 84. The cylindrical inside surface 84 is eccentric or laterally offset relative to the cylindrical outside surface 82 by an eccentric dimension "E", illustrated in exaggerated fashion in FIG. 6 for clarity, between a centerline 86 of the cylindrical outside surface and a centerline 88 of the cylindrical inside surface. The elastomeric ring 78 thus has a short radial thickness dimension "$T_1$" and a diametrically opposite long radial thickness dimension "$T_2$" between the cylindrical inside and cylindrical outside surfaces 84,82. The sleeve 80 is secured to the elastomeric ring 78 in the cylindrical inside surface 84 thereof and includes a cylindrical journal surface 90 interrupted by a relief slot 92.

When the elastomeric ring 78 is angularly oriented around the rack bar 30 such that the journal surface 90 of the sleeve 80 slidably engages the convex seat 62 on the rack bar, the relief slot 92 arches over the rack gear 40 and the short and long thickness dimensions $T_1$, $T_2$ are parallel to the longitudinal centerline 52 of the cylindrical inside wall 54 of the tubular boss 50. The outboard bearing 76 is mounted on the steering gear housing 12 in a cup-shaped seat 94, FIGS. 3–4, which is symmetric with respect to the longitudinal centerline 56 of the rack bar 30 and on the opposite side of the pinion gear 22 and the rack bearing 58 from the bushing 68.

Because the position of the longitudinal centerline 56 of the rack bar is established by the omnidirectional slide bearings constituted by the pinion gear 22 and the rack bearing 58 and by the bushing 68, the elastomeric ring 78 must be resiliently compressed at the long radial dimension $T_2$ thereof in order to fit the outboard bearing 76 in the seat 94 with the sleeve 80 around the rack bar. Consequently, once the outboard bearing is seated in the seat 94, the asymmetrically compressed elastomeric ring 78 resiliently thrusts the rack bar in a direction represented by a schematic thrust vector "F", FIG. 4, parallel to the longitudinal centerline 52 of the 1 cylindrical inner wall of the tubular boss and, therefore, parallel to the thrust direction of the rack bearing 58. The outboard bearing 76 thus constitutes a unidirectional, i.e. in one direction, slide bearing supporting the rack bar on the steering gear housing in the direction of the schematic thrust vector F for back and forth linear translation in the direction of the longitudinal centerline 56 of the rack bar.

Importantly, the schematic thrust vector F parallel to the longitudinal centerline 52 supplements the rack bearing 58 in thrusting together the rack gear teeth 42 and the pinion gear teeth 24 to reduce the likelihood of separation therebetween. Likewise, because the outboard unidirectional slide bearing 76 is located on the opposite side of the pinion gear 22 and the rack bearing 58 from the bushing 68, the overhang distance $D_1$ is significantly reduced as is the corresponding likelihood of separation between the rack gear teeth and the pinion gear teeth attributable to vibrations induced by forces transferred from the steering knuckle 70 by the tie rod 74A. Any misalignment between the longitudinal centerline 56 of the rack bar 30 and the center of the seat 94 on the steering gear housing attributable to manufacturing tolerances is accommodated by incrementally more or less asymmetric compression of the elastomeric ring without adverse affect on back and forth linear translation of the rack bar.

Having thus described the invention, what is claimed is:

1. In a rack and pinion steering gear including
   a steering gear housing,
   a rack bar traversing the steering gear housing having a plurality of flat rack gear teeth thereon and an elongated convex seat behind the flat rack gear teeth, a pinion gear supported on the steering gear housing for rotation about a pinion shaft axis of the steering gear housing having a plurality of helical pinion gear teeth thereon facing the flat rack gear teeth on the rack bar, a rack bearing supported on the steering gear housing on the opposite side of the rack bar from pinion gear for linear translation perpendicular to a longitudinal centerline of the rack bar and including a concave seat facing the elongated convex seat on the rack bar, a rack bearing spring between the steering gear housing and the rack bearing thrusting the concave seat on the rack bearing against the convex seat on the rack bar thereby to thrust together the pinion gear teeth and the rack gear teeth so that the rack bearing and the pinion gear cooperate in constituting a first omnidirectional slide bearing supporting the rack bar on the steering gear housing for linear translation in the direction of the longitudinal centerline of the rack bar concurrent with rotation of the pinion gear, and a bushing around the rack bar supported on the steering gear housing remote from the pinion gear and the rack bearing constituting a second omnidirectional slide bearing supporting the rack bar on the steering gear housing for linear translation in the direction of the longitudinal centerline of the rack bar, the improvement comprising:

an outboard unidirectional slide bearing means on the steering gear housing on the opposite side of the first omnidirectional slide bearing from the second omnidirectional slide bearing operable to support the rack bar on the steering gear housing for linear translation in the direction of the longitudinal centerline of the rack bar and to thrust the rack bar parallel to the thrust direction of the rack bearing spring thereby to supplement the thrust of the rack bearing spring.

2. The rack and pinion steering gear recited in claim 1 wherein the outboard unidirectional slide bearing means comprises:

a cup-shaped seat on the steering gear housing on the opposite side of the first omnidirectional slide bearing from the second omnidirectional slide bearing symmetric relative to the longitudinal centerline of the rack bar, an elastomeric ring having a cylindrical outside surface seated in the cup-shaped seat on the steering gear housing and a cylindrical inside surface eccentric relative to the cylindrical outside surface, and a bearing element supported on the elastomeric ring in the cylindrical inside surface thereof and defining a sliding support for the rack bar on the steering gear housing at the cup-shaped seat thereon, the elastomeric ring being resiliently compressed asymmetrically between the bearing element and the cup-shaped seat on the steering gear housing and angularly oriented around the longitudinal centerline of the rack bar so that the corresponding resilient thrust of the elastomeric ring is parallel to the thrust of the rack bearing spring.

3. The rack and pinion steering gear recited in claim 2 wherein the bearing element comprises:

a tubular sleeve around the rack bar supported on the elastomeric ring in the cylindrical inside surface thereof having a journal surface slidably engaging the convex seat on the rack bar.

* * * * *